(12) United States Patent
Bradford

(10) Patent No.: US 6,461,506 B1
(45) Date of Patent: Oct. 8, 2002

(54) FILTER

(75) Inventor: Peter Francis Bradford, Sudbury (GB)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/538,682

(22) Filed: Mar. 30, 2000

(30) Foreign Application Priority Data

Mar. 31, 1999 (GB) .............................................. 9907330

(51) Int. Cl.⁷ .............................................. B01D 29/44
(52) U.S. Cl. ........................ 210/309; 210/448; 210/488; 210/497.3
(58) Field of Search .............................. 210/497.3, 488, 210/307, 308, 309, 418, 497.01, 498, 448, 299, 452; 239/DIG. 23

(56) References Cited

U.S. PATENT DOCUMENTS

| | | | | |
|---|---|---|---|---|
| 2,049,336 A | * | 7/1936 | Stine | 210/497.01 |
| 3,074,558 A | * | 1/1963 | Huntowski | 210/299 |
| 3,392,842 A | * | 7/1968 | Anderson | 210/448 |
| 3,397,794 A | * | 8/1968 | Toth et al. | 210/488 |
| 3,542,676 A | * | 11/1970 | Colburn et al. | 210/497.3 |
| 4,052,315 A | * | 10/1977 | Lindsay, Jr. et al. | 210/232 |
| 4,473,470 A | * | 9/1984 | Loutit | 210/409 |
| 4,725,364 A | * | 2/1988 | Hurley et al. | 210/497.3 |
| 4,751,000 A | * | 6/1988 | Drori | 210/448 |
| 5,387,340 A | * | 2/1995 | Ackerman | 210/497.01 |
| 5,516,424 A | * | 5/1996 | Strohschein | 210/232 |

FOREIGN PATENT DOCUMENTS

| | | |
|---|---|---|
| CH | 519102 | 2/1972 |
| DE | 899295 | 12/1949 |
| GB | 429405 | 5/1935 |
| GB | 754528 | 8/1956 |

* cited by examiner

*Primary Examiner*—Matthew O. Savage
(74) *Attorney, Agent, or Firm*—Thomas N. Twomey

(57) ABSTRACT

A filter for a fuel injection device, comprising a plurality of filter elements arranged within a housing such that, in use, fluid is directed through clearances of predetermined size between respective mutually adjacent ones of the elements for preventing the passage of oversized contaminant particles carried in the fluid.

7 Claims, 3 Drawing Sheets

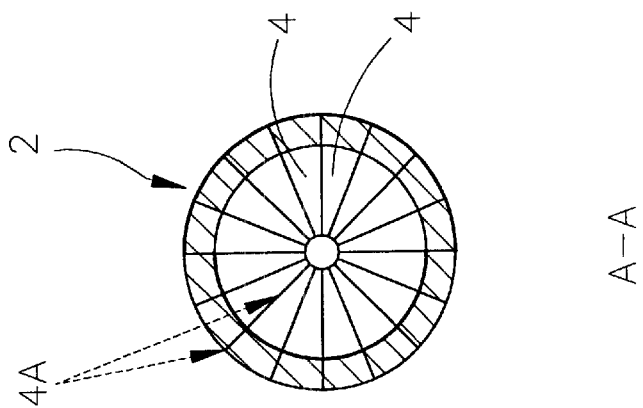
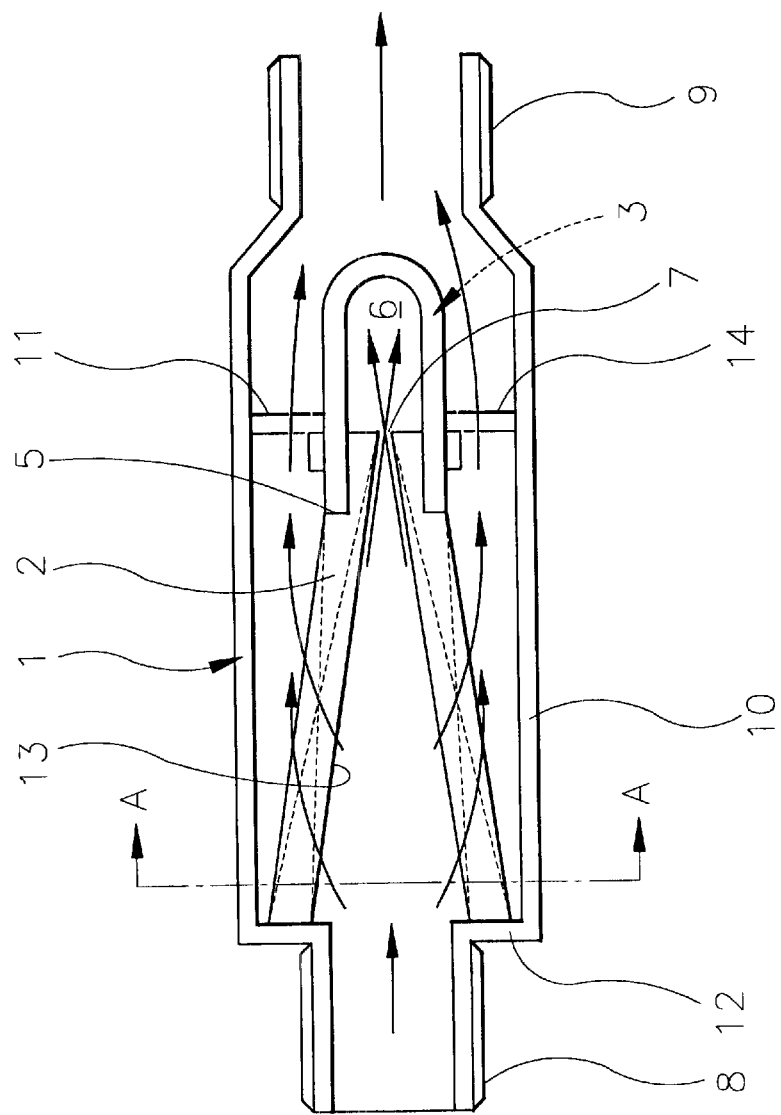

FILTER

TECHNICAL FIELD

This invention relates to a filter and more particularly, but not exclusively, to a final stage filter for a fuel injection device.

BACKGROUND OF THE INVENTION

Devices commonly known as "edge filters" are typically disposed in a fuel injector or injector adapter to protect the finely dimensioned final stage conduits of an injection device, which may be as small as around 25 µm in diameter, from contamination by undesirably large particles. Such particles may, for example, be the residue of the combustion process, internal deterioration debris, service-induced debris, or matter that has penetrated the main filter. A fuel injection device having an edge filter typically defines a narrow passageway between a surface of the edge filter and a housing of the device in which the edge filter is disposed, for removing particles above a predetermined size from fuel that must flow through the passageway towards an outlet of the injector.

SUMMARY OF THE INVENTION

The inventor has identified two main problems with such edge filters. Firstly, the housing that partially forms the passageway has been found to elastically extend so as to dilate away from the surface of the edge filter when subjected to fuel under high pressure, thereby temporarily widening the passageway and permitting oversize contaminant particles to pass. Secondly, an oversize particle is continually re-presented to the passageway's entrance so that the particle is inevitably either reshaped by the high pressure fuel entering the passageway until it is small enough in at least one dimension to fit through the passageway, or the particle passes through the passageway as the wall of the injector dilates. These problems can lead to an edge filter passing contaminant particles having dimensions of significantly larger than the nominal spacing of the wall of the passageway from the surface of the edge filter.

An object of the invention is to mitigate or overcome at least one of the above-mentioned problems.

Accordingly, the invention provides a filter for a fuel injection device, comprising a plurality of filter elements arranged within a housing such that, in use, fluid is directed through clearances of predetermined size between respective mutually adjacent ones of the elements for preventing the passage of oversized contaminant particles carried in the fluid.

Preferably, the elements are arranged side by side in a loop such that, in use, force exerted on one side of one of the elements by pressurized fluid in a respective one of the clearances is opposed by force exerted on another side of this element by pressurized fluid in a next adjacent one of the clearances.

In this manner, the effects of high pressure in the filter clearances can be balanced and any significant increase in the size of the clearances due to the fuel pressure can be alleviated.

The invention also includes a fuel injection device having a housing, a 3 filter disposed in the housing for rejecting oversized contaminant particles, and a particle collection zone, the filter being configured and arranged relative to the housing such that, in use, fluid flowing through the filter directs rejected particles away from the filter into the particle collection zone.

This reduces time spent by a particle in contact with the filter, and reduces the opportunity for high-pressure pulses in the fluid to reshape the particle and force it through the filter.

The filter is conveniently of the type described hereinbefore.

BRIEF DESCRIPTION OF THE DRAWINGS

In order that the invention may be well understood, by way of example only, two embodiments thereof will now be described with reference to the accompanying drawings, in which:

FIG. 1 is a cross-sectional view through a fuel injection device in accordance with the invention;

FIG. 2 is a view taken along line AA in FIG. 1;

DESCRIPTION OF THE PREFERRED EMBODIMENT

Figure 2A:
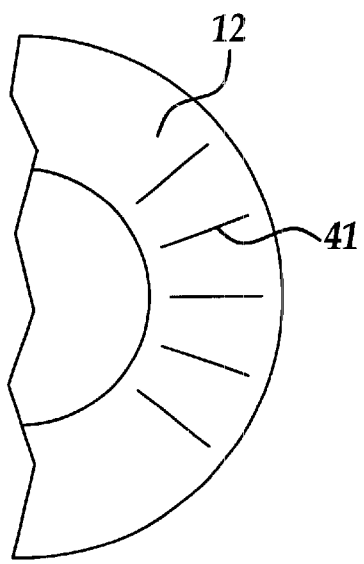
FIG. 2A is a full view of an inner surface of a transversely extending wall of a housing of the fuel injecction device of FIG. 1 with protrusions formed thereon for spacing apart the filter elements.

Referring to FIGS. 1 and 2, a portion of a fuel injection device is shown including a housing 1, a filter 2 disposed within the housing 1 and a collector 3. The filter 2 is formed as a segmented hollow generally frusto-conical arrangement formed of sixteen segments or elements 4. Each of the sixteen elements 4 of the filter 2 is separated by a clearance 4a of approximately 15 µm from its neighboring elements 4.

The collector 3 comprises a hollow body closed at one end. The open end of the collector 3 is sealingly fitted around the narrower end of the filter 2 in an annular recess 5 provided therein for receiving the collector 3. As best seen in FIG. 1, the collector forms a chamber 6 and the inner periphery of the narrow end of the filter 2 provides a relatively small inlet opening 7 to the chamber 6.

Figure 2B:
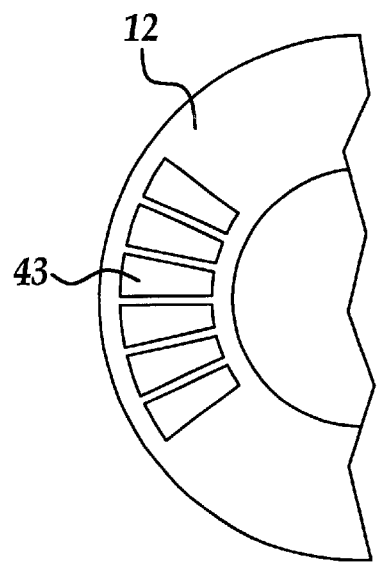
FIG. 2B is a full view of an inner surface of a transversely extending wall of a housing of the fuel injection device of FIG. 1 with reliefs machined therein for spacing apart the filter elements.
Figure 2C:
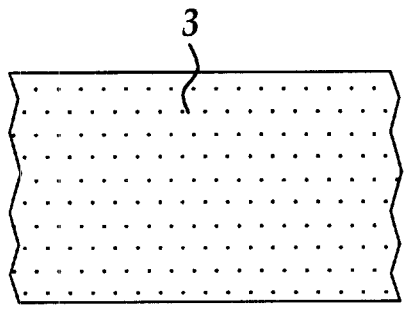
FIG. 2C is a partial side view of a collector formed of sintered metal.
Figure 2D:
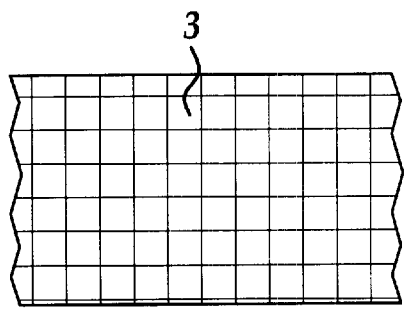
FIG. 2D is a partial side view of a collector formed of mesh.
Figure 2E:
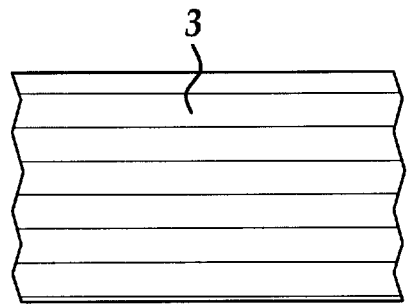
FIG. 2E is a partial side view of a collector formed of segment-shaped elements.

The housing 1 comprises an inlet portion 8, an outlet portion 9 and an intermediate portion 10 between the portions 8 and 9. The intermediate portion 10 is provided with a support wall 11 which extends radially inwardly of the housing 1 and engages and supports the collector 3. The collector 3 is relatively rigid and is thus able to locate and support the narrow end of the filter 2 in the position shown in FIG. 1. The wide end of the filter 2 engages an inner surface of a transversely extending wall 12 of the housing 1. This inner surface is provided with means 40 for engaging the axial ends of the elements 4 for maintaining the peripheral spacing between the ends of the elements 4. With reference to FIGS. 2A and 2B, the engaging means could, for example, be provided by protrusions 41 on the inner surface of the wall 12 or alternatively by reliefs 43 machined in the inner surface of the wall 12.

In use, fuel is driven through the inlet portion 8 in the direction of the arrows shown in FIG. 1 and into the wide end of the filter 2. Because of the greatly restricted flow through the orifice 7 at the narrow end of the filter 2 and the presence of the collector 3, most of the fuel is directed through the clearances 4a of the filter 2. Any particle having a minor dimension greater than the 15 µm filter clearance will not be able to pass through the clearances 4a and will engage the inner peripheral surface 13 of the filter 2. Because fuel passing through the filter 2 has a flow component directed parallel to the inner peripheral surface 13, filtered contaminant particles are swept through the narrow end of the filter and into the chamber 6. Filtered fuel passes through perforations 14 in support wall 11 and through the outlet portion 9 of the housing 1 for injection into an engine cylinder (not shown). Contaminant particles are retained in the chamber 6 so that there is little opportunity for them to be shaped and forced through the clearances 4a by high pressure fuel pulses. It will be appreciated that the chamber 6 acts as a collection zone.

The collector 3 may be impermeable, particles being retained in chamber 6 by virtue of the relatively small entry orifice 7. Alternatively, the walls of the chamber may be permeable to permit a relatively low rate of flow through the chamber 6. The collector 3 may, for example, be made from a sintered material (FIG. 2C) or a mesh (FIG. 2D), or comprise segment-shaped elements (FIG. 2E) arranged in a manner similar to the elements 4 of the filter 2 to provide clearances of a size equal to or smaller than the size of the clearances 4a. Such through-flow may be beneficial in some circumstances in reducing excitation of particles in the chamber 6 due to reverberation during operation of the fuel injection device. The size of the chamber 6 should be commensurate with the expected number of particles likely to be collected in the planned service period for any particular application. Accumulation of particles in the chamber does not prevent flow-through significantly since the force of the flow is insufficient to reshape the particles.

Peripherally directed forces exerted by high pressure fluid in the clearances 4a on the sides of the elements 4 tend to balance each other out so that these forces do not significantly increase the size of the clearances 4a during high pressure operation. Furthermore, as should be clear from the above description, contaminant particles which are unable to pass through the clearances 4a are immediately directed into the chamber 6 remote from the filter 2 where they are no longer subject to significant reshaping forces which might otherwise force them through the filter clearances 4a.

The filter 2 provides a flow area of about 7 mm$^2$, but it should be apparent that the dimensions of the filter 2 and the number of elements 4 can be adjusted to suit a desired application.

Figure 4:
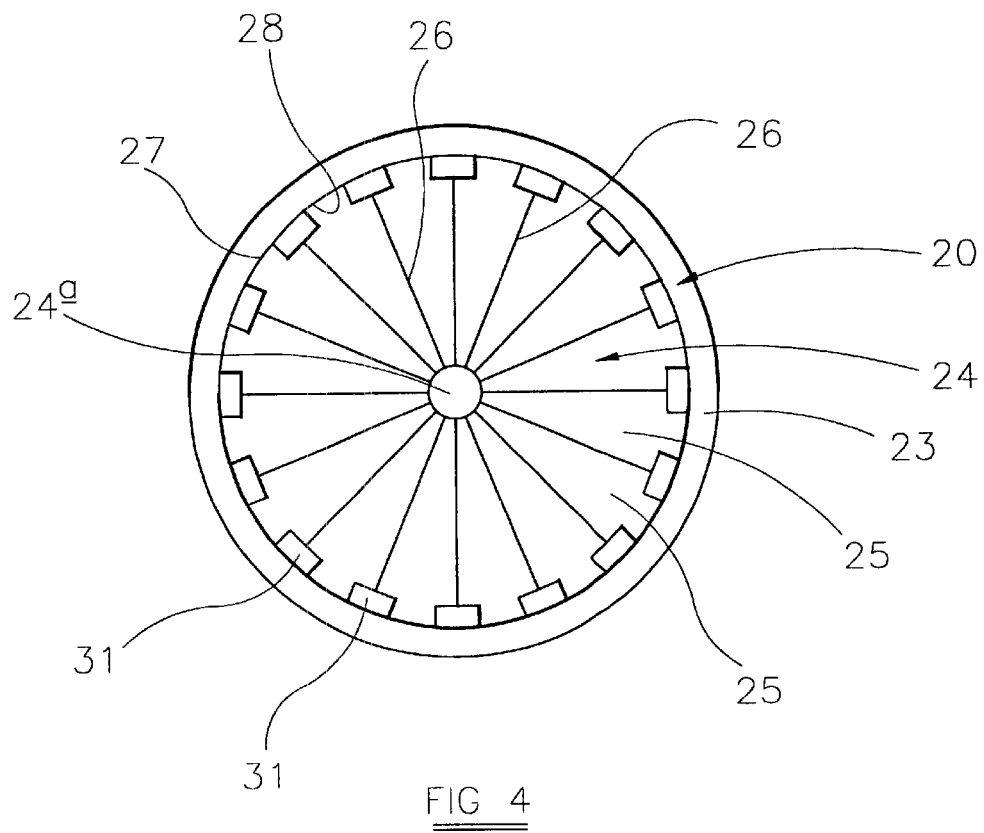
FIG. 4 is a view taken on line BB in FIG. 3.
Figure 3:
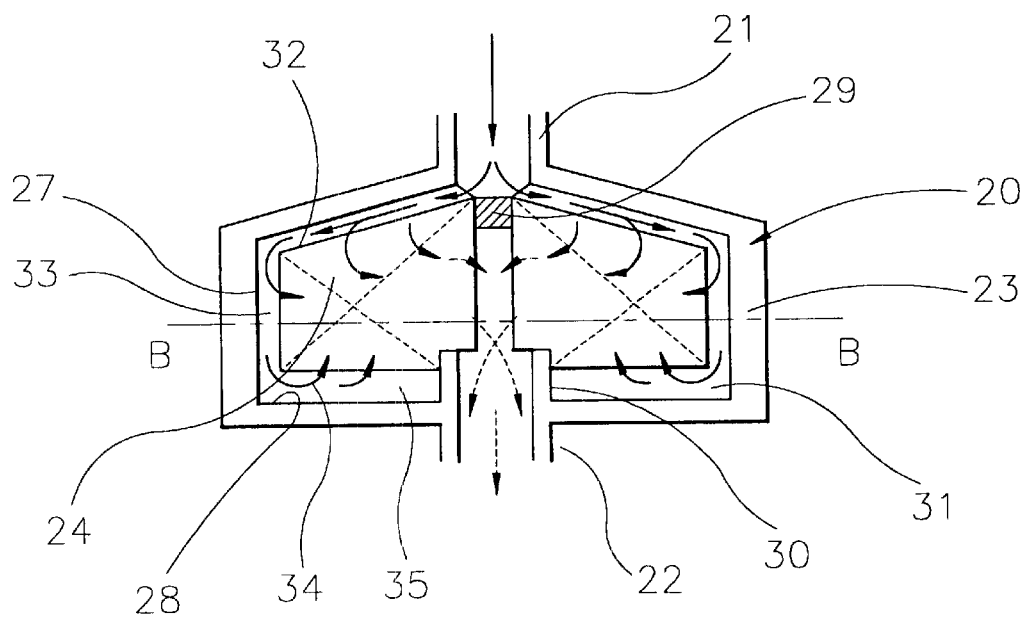
FIG. 3 is a cross-sectional view of another fuel injection device in accordance with the invention.

Referring now to FIGS. 3 and 4, a portion of another fuel injection device is shown. The device comprises a housing 20 having an inlet portion 21, an outlet portion 22 and an intermediate portion 23. The intermediate portion 23 is considerably wider than the inlet and outlet portions 21,22 and houses a filter 24. The filter 24 takes the form of a thick walled tube defining a central hole 24a. The tube comprises sixteen segment-shaped elements 25. Each element 25 is separated from its adjacent elements 25 by a predetermined clearance 26. The filter 24 is fitted snugly within the housing 20 so as substantially to prevent the flow of fuel between an outer peripheral surface 27 of the filter and an inner peripheral surface 28 of the housing 20.

One end (the upper end as shown in FIG. 3) of the filter's central hole 24a is blocked by a closure 29. The other end of the filter's central hole 24a (the lower end as shown in FIG. 3) is stepped and receives an inwardly extending tube 30 which provides fluid communication between the central hole 24a of the filter and the outlet portion 22 of the housing 20.

The axial end faces and outer peripheral surface of the filter are provided with recesses which form channels 31. Each channel 31 bridges a respective one of the clearances 26 and extends axially along the entire dirty-side surface of the filter 24.

In use, fuel is driven in the direction of the arrows shown in FIG. 3 through the inlet portion 21 of the housing 20. Fuel enters the channels 31 and flows over a first, downwardly sloping, section 32 of each channel, through a second, vertical, section 33 to a third, horizontal, section 34. As shown by the arrows in FIG. 3, some of the fuel flows through the clearances 26 as it progresses along the channels 31. Particles which are unable to pass through the clearances 26 are swept along the sloping section 32 of each channel 31, down the vertical section 33 and along the horizontal section 34 by the fuel as it flows through the filter. The particles will come to rest in the general proximity of a collection zone 35 of relatively undisturbed flow at the bottom of each channel 31. The particles tend to settle in the undisturbed zone 35 and are not subject to any significant shaping forces. The elements 25 are pressure balanced in a manner similar to the elements 4 described in relation to FIGS. 1 and 2 and thus the clearances 26 are not prone to dilation effects.

Although in the description hereinbefore, the filter is intended for use in a system of the type in which fuel is driven through the filter, for example by a pump located upstream of the filter or by the fuel pressure within a common rail, it will be appreciated that the invention is also applicable to arrangements in which fuel is drawn through the filter, for example by a fuel pump located downstream of the filter.

What is claimed is:

1. A filter for a fuel injector device, comprising:

a tubular housing surrounding a longitudinal axis, the housing having an inlet at a first end and an outlet at a second end, wherein said inlet and outlet surround said longitudinal axis, wherein the first end of the housing includes an inner surface that extends transversely relative to said longitudinal axis and a perforated support wall disposed within said housing axially between said first end of the housing and said second end of the housing, said support wall extending transversely relative to the longitudinal axis from an inner surface of said housing;

a plurality of filter elements arranged within said housing, each of said plurality of filter elements being substantially impermeable to a flow of fuel there through, each of said filter elements having a first end adjacent to the fist end of the housing and a second end proximate said support wall, each said filter element including opposite sides extending from the first end to the second end of the respective filter element, wherein the sides of each of said plurality of filter elements are disposed adjacent to and spaced a predetermined distance apart from the sides of adjacent ones of said plurality of filter elements to define a plurality of clearances between adjacent said filter elements, said plurality of clearances defining passageways for the flow of a fuel there through and preventing the passage there through of contaminant particles carried in the fuel having a size larger than said predetermined distance;

first support means disposed on said inner surface of said first end of the housing for engaging a surface of the first ends of said filter elements such that the filter elements surround said longitudinal axis and such that the sides of said filter elements are spaced apart by said predetermined distance; and second support means disposed on said support wall for engaging a surface of said second ends of said filter elements such that said filter elements surround said longitudinal axis;

wherein fuel flows from said inlet into an inlet space surrounded by radially inner surfaces of said filter elements, wherein fuel flows from said inlet space radially outwardly through said clearances, wherein fuel flows from said clearances radially outwardly into an outlet space between radially outer surfaces of said filter elements and a radially inner surface of said housing, and wherein fuel flows axially from said outlet space through said perforated support wall to said outlet.

2. The filter as claimed in claim 1, wherein said plurality of filter elements are arranged side by side into a generally frusto-conical shape such that force exerted on one side of one of said plurality of filter elements by pressurized fuel in an adjacent one of said clearances is opposed by force exerted on the other side of said one of said plurality of filter elements by pressurized fuel in the other adjacent one of said clearances.

3. The filter as claimed in claim 2, wherein said second support means includes a collector defining a particle collection chamber, said particle collection chamber being disposed downstream from said filter for accumulating said contaminant particles.

4. The filter as claimed in claim 3, wherein a narrower end of said frusto-conical shape defines an inlet opening into said collection chamber and which serves to restrict the flow of fuel into said collection chamber.

5. The filter as claimed in claim 3, wherein the collector is substantially impermeable so as to ensure particles entering the collection chamber are substantially retained therein.

6. The filter as claimed in claim 3, wherein the collector is permeable to permit a flow of fuel therethrough.

7. The filter as claimed in claim 6, wherein the collector comprises clearances of a size equal to or smaller than the size of the clearances between adjacent sides of said filter elements.

* * * * *